March 25, 1969     D. A. FRAGNITO     3,434,409
AIR DISTRIBUTION UNIT
Filed March 1, 1967
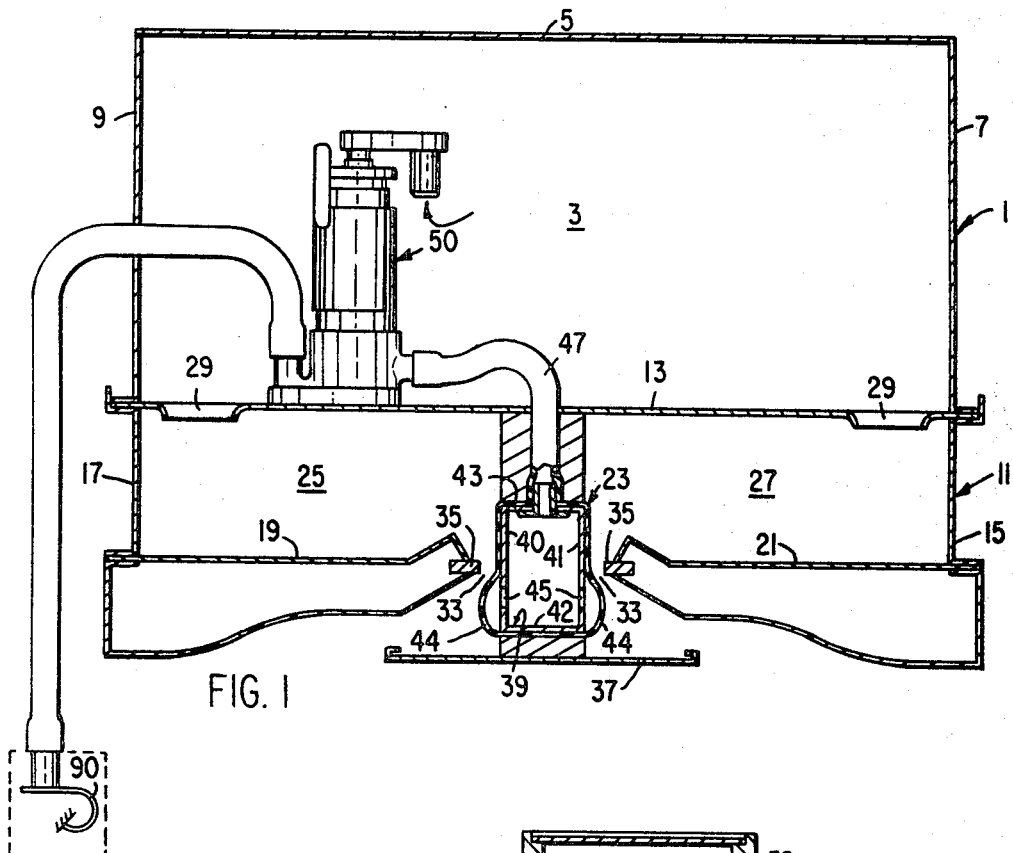
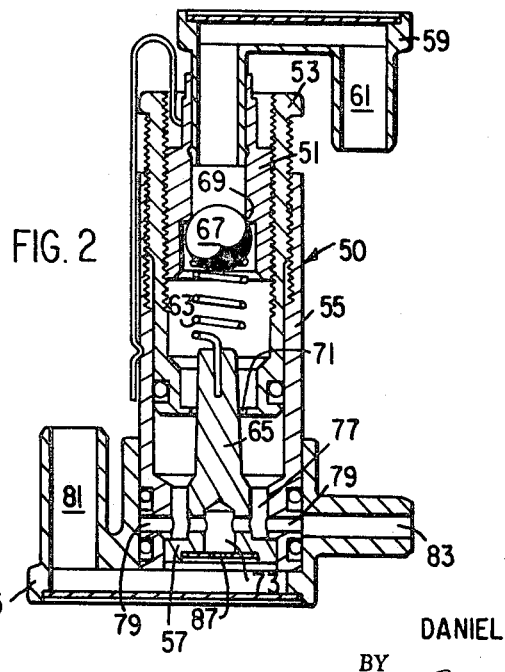
INVENTOR.
DANIEL A. FRAGNITO.
BY James E. Schardt
ATTORNEY.

United States Patent Office 3,434,409
Patented Mar. 25, 1969

3,434,409
AIR DISTRIBUTION UNIT
Daniel A. Fragnito, Solvay, N.Y., assignor to Carrier Corporation, Syracuse, N.Y., a corporation of Delaware
Filed Mar. 1, 1967, Ser. No. 619,731
Int. Cl. F24f 13/10, 7/04
U.S. Cl. 98—41                                  6 Claims

ABSTRACT OF THE DISCLOSURE

An air discharge unit having a variable area discharge slot for use in an air conditioning system. The discharge slot area is controlled in response to duct pressure to reduce the discharge area of the unit upon an increase in duct pressure and increase the discharge area of the unit upon a decrease in duct pressure to maintain a constant discharge air quantity irrespective of duct pressure. A duct pressure operated control valve in the unit employs two calibrated orifices in series to provide control air pressure intermediate the duct pressure and ambient air pressure to vary the unit discharge area.

Background of the invention

This invention relates to air conditioning systems and more particularly to a control for an air distribution unit employed in an air conditioning system to maintain a constant quantity of air flow therethrough.

In United States Letters Patent No. 3,167,253, granted Jan. 26, 1965, to Richard A. Church and Borris W. Haritonoff, there is disclosed an air distributing unit to provide a relatively constant supply of conditioned air to a room or portion of a building. The air distributing unit disclosed therein has a pressure responsive mechanism for maintaining a constant base quantity of air flow therethrough regardless of duct pressure while allowing a slight variation in air quantity in response to room temperature variations as sensed by a bleed type thermostat.

Summary of the invention

In accordance with a preferred embodiment of this invention, a simple, improved constant volume controller is provided for maintaining a constant discharge of air from an air handling unit of an air conditioning system utilizing duct pressure actuated bellows to vary discharge slot area through which air is discharged. Two calibrated orifices in series supplied with duct pressure and exhausting to atmosphere or to a bleed type thermostat produce an intermediate pressure which when plotted against duct pressure produces a curve identical to the curve of duct pressure versus bellows pressure necessary to produce a constant air flow through the air handling unit. Thus, the intermediate pressure can be supplied to the bellows to assure constant air discharge from the unit regardless of duct pressure.

Brief description of the drawings

FIGURE 1 is a sectional view of an air distributing unit illustrating the damper and a control mechanism therefor to maintain constant air discharge from the unit.

FIG. 2 is a sectional view of the control mechanism employed in the air distributing unit of FIGURE 1.

Description of the preferred embodiment

Referring to the drawings, there is shown an air distributing unit 1 including a duct section 3 having a top wall 5 and side walls 7 and 9. The air distributing section 11, which is separated from duct section 3 by partition 13, is defined by side walls 15 and 17 and bottom sections 19 and 21. Air distributing section 11 is divided by a variable volume control chamber 23 into plenums 25 and 27. Openings 29 in partition 13 provide passageway for conditioned air between duct section 3 and plenums 25 and 27.

Air is discharged from plenums 25 and 27 into the area to be conditioned through slots 33 formed between edges 35 of bottom sections 19, 21 and variable volume control chamber 23. A deflector 37 is mounted on the bottom portion of control chamber 23 to deflect the air discharged from slots 33 in a generally horizontal direction.

Control chamber 23 includes a support member 39 defined by walls 40, 41, 42 and 43. The walls are covered with a suitable fabric envelope 44 which forms the bladder portion of the control chamber 23. The fabric may consist of a cloth impregnated with a suitable elastomer material, such as a nylon fabric coated or impregnated with neoprene or a polymerized butadiene.

Openings 45 are provided in walls 40 and 41 for passage of control air into the bladder, control air being provided to control chamber 23 through line 47. As will be explained hereinafter, control air pressure is normally lower than the pressure existing in plenums 25 and 27. Because of this, the upper portion of the bladder will be maintained in substantial surface contact with the walls 40 and 41. However, as the air passes through slots 33, it is expanded thereby decreasing its pressure. The lower portion of the bladder damper will be at a higher pressure than the adjacent air, causing the lower portion of the bladder to inflate, the degree of inflation determining the width of slot 33 and therefore the quantity of air discharged therethrough.

The control valve 50 employed with the air distributing unit has a top section 51, an upper cylindrical section 53, a lower cylindrical section 55, and a bottom section 57. Threads are provided on sections 51, 53 and 55 to allow adjustment of the relative positions therebetween for reasons to be hereinafter explained. A cap 59 having a passageway 61 therethrough for passage of air from duct section 3 to the interior of control valve 50, is provided for attachment to top section 51. A spring 63 affixed to tapered post 65 of bottom section 57 is provided for biasing a relief ball 67 against seat 69 formed in top section 51. Upper cylindrical section 53 is provided with an orifice 71 which in conjunction with tapered post 65 regulates flow of control air therethrough. Vertical passageway 73 and horizontal passageways 79 are provided in bottom section 57 for passage of control air into ducts 81 and 83 of mounting base 85. An orifice 87 between vertical passageway 77 and duct 81 is provided for restricting flow of bleed air from control 50. Air from duct 83 is provided to variable volume control chamber 23 through tube 47.

As can be seen by reference to FIGURE 2, spring pressure on relief ball 67 may be adjusted by altering the relative positions of bottom section 57 and top section 51. Air flow through orifice 71 may be regulated by altering the relative positions of upper cylindrical section 53 and bottom section 57.

Before the operation of the air discharge unit can be described, the relationship between the control valve and the bellows must be understood. For a constant air flow, the variable volume control chamber must be provided with an intermediate pressure proportional to duct pressure.

The control valve is a device that when calibrated produces an intermediate pressure in duct 83 which is also proportional to pressure in duct 3. The intermediate pressure produced in duct 83 varies in proportion to duct pressure the same as the pressure in chamber 23 must be varied in proportion to duct pressure to maintain a constant air discharge. Thus, the control system will always produce a pressure at duct 83 which, if communicated to the control chamber, will provide a slot width necessary to produce the desired constant discharge of air, irrespective of the pressure of the air supplied to the unit.

Because of the resistance in the plenums, damper slots, etc., a minimum duct pressure is necessary to produce the desired air flow through the unit. By considering the weight of relief ball 67, the projected area and the restraining force of spring 63, the pressure at which the relief ball lifts up can be preset to correspond with the minimum duct pressure necessary for desired air flow.

As the duct pressure increases, the bellows pressure increases. By adjusting the free area of orifice 71 in relation to orifice 87, the relationship between supply air pressure and pressure in duct 83 can be matched to the characteristic curve of the control chamber.

To obtain a different air flow through the unit, the free area of orifice 71 and the restraining force on ball 67 must be changed. Then the ball will unseat at a slightly different minimum duct pressure and the relationship between duct pressure versus bellows pressure will give another constant air quantity curve.

In the foregoing description, it has been assumed that a constant air flow is desired. If this is so, duct 81 would be bled to atmosphere. However, in some installations, while it is desired to maintain a relatively constant air flow, it may be necessary to vary the flow slightly in response to changing heating or cooling loads encountered in the area served by the air discharge unit. In this instance, air from duct 81 would be vented through a bleed type thermostat as illustrated in FIGURE 1 by thermostat 90. Since the thermostat would vary the air bled through orifice 87, pressure supplied to the bellows would vary to some extent, in turn causing the quantity of air discharged from the unit to range slightly below the set quantity.

While I have described and illustrated a preferred embodiment of my invention, it will be understood that my invention is not limited thereto since it might be otherwise embodied within the scope of the following claims.

I claim:

1. In combination with an air distributing unit for discharging air into an area to be treated including a plenum chamber, said plenum chamber being adapted to be placed in communication with the source of air at a desired pressure, means defining an outlet from said plenum chamber into the area to be treated and a variable volume control chamber for regulating the quantity of conditioned air supplied to the area to be treated through the outlet, a control valve having a first chamber and a second chamber therein, the first chamber communicating with the plenum chamber and the second chamber communicating with the variable volume control chamber, pressure relief means associated with the first chamber to prevent flow of air therein below a desired minimum pressure, first restriction means disposed between the first and second chambers, fixed restriction means disposed in said second chamber for exhausting control air therefrom and a control air pressure duct disposed between said first and fixed restriction means to communicate the pressure in the second chamber to the variable volume control chamber to regulate discharge of air from the air distribution unit.

2. An air distributing unit according to claim 1 wherein said pressure relief means includes a seat formed in said control valve, a ball for mating engagement with said seat and biasing means operably associated with said ball for urging said ball against said seat.

3. An air distributing unit according to claim 1 wherein said first restriction means comprises means forming an orifice in said control valve, a tapered post disposed in the orifice, said post being movable therein to vary the free area of the orifice.

4. A control valve for use in an air distributing unit including a control chamber, the control valve having a first chamber and a second chamber therein, pressure relief means associated with the first chamber to prevent flow of air therein below a desired minimum pressure, first restriction means disposed between the first and second chambers, fixed restriction means disposed in said second chamber for exhausting control air therefrom and a control air pressure duct disposed between said first and fixed restriction means to communicate the pressure in the second chamber to the air distribution unit.

5. A control valve according to claim 4 wherein said pressure relief means includes a seat formed in said control valve, a ball for mating engagement with said seat and biasing means operably associated with said ball for urging said ball against said seat.

6. A control valve according to claim 4 wherein said first restriction means comprises means forming an orifice in said control valve, a tapered post disposed in the orifice, said post being movable therein to vary the free area of the orifice.

References Cited

UNITED STATES PATENTS

| 2,646,932 | 7/1953 | Frost | 236—80 |
| 3,167,253 | 1/1965 | Church et al. | 236—80 |
| 3,122,318 | 2/1964 | Null | 236—87 |
| 3,343,564 | 9/1967 | Peeples et al. | 137—539 |

ROBERT A. O'LEARY, Primary Examiner.

WILLIAM E. WAYNER, Assistant Examiner.

U.S. Cl. X.R.

137—539; 236—49, 80